(12) United States Patent
Thereska et al.

(10) Patent No.: US 9,244,615 B2
(45) Date of Patent: Jan. 26, 2016

(54) SYSTEMS AND METHODS BASED ON POLICY CRITERIA FOR CONTROLLING THE FLOW OF DATA STORAGE INPUT/OUTPUT REQUESTS BETWEEN ENDPOINTS

(71) Applicant: Microsoft Technology Licensing, LLC, Redmond, WA (US)

(72) Inventors: Eno Thereska, Cambridge (GB); Hitesh Ballani, Cambridge (GB); Gregory O'Shea, Cambridge (GB); Thomas Karagiannis, Cambridge (GB); Antony Ian Taylor Rowstron, Cambridge (GB); Thomas M Talpey, Stow, MA (US); Richard John Black, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/027,012

(22) Filed: Sep. 13, 2013

(65) Prior Publication Data
US 2015/0081948 A1    Mar. 19, 2015

(51) Int. Cl.
*G06F 3/00* (2006.01)
*G06F 3/06* (2006.01)
(Continued)

(52) U.S. Cl.
CPC .............. *G06F 3/061* (2013.01); *G06F 3/0631* (2013.01); *G06F 3/0673* (2013.01); *H04L 45/20* (2013.01); *H04L 45/50* (2013.01); *H04L 47/10* (2013.01); *H04L 49/90* (2013.01); *G06F 11/3684* (2013.01)

(58) Field of Classification Search
CPC ..... G06F 3/061; G06F 3/0631; G06F 3/0637; H06F 11/3684
USPC ................ 710/8–10, 62–64; 711/162–164
See application file for complete search history.

(56) References Cited

U.S. PATENT DOCUMENTS

| 5,095,427 A | 3/1992 | Tanaka et al. |
| 5,983,368 A | 11/1999 | Noddings |

(Continued)

FOREIGN PATENT DOCUMENTS

EP    1727056    11/2006

OTHER PUBLICATIONS

Gulati, et al., "Towards Distributed Storage Resource Management using Flow Control", In Newsletter of ACM SIGOPS Operating Systems Review, vol. 42, Issue 6, Oct. 2008, 6 pages.

(Continued)

*Primary Examiner* — Tammara Peyton
(74) *Attorney, Agent, or Firm* — Sandy Swain; Steve Wight; Micky Minhas

(57) ABSTRACT

Controlling data storage input/output requests is described, for example, to apply a policy to an end-to-end flow of data input/output requests between at least one computing entity and at least one store. In various examples a plurality of queues are configured at one or more stages of the end-to-end flow and controlled to adhere to a policy. In examples, each stage has a control interface enabling it to receive and execute control instructions from a controller which may be centralized or distributed. For example, the control instructions comprise queuing rules and/or queue configurations. In various examples queues and queuing rules are dynamically created and revised according to feedback about any of: flow behavior, changes in policy, changes in infrastructure or other factors. In examples, high level identifiers of the flow endpoints are resolved, on a per stage basis, to low level identifiers suitable for use by the stage.

20 Claims, 9 Drawing Sheets

(51) Int. Cl.
*H04L 12/801* (2013.01)
*H04L 12/861* (2013.01)
*H04L 12/733* (2013.01)
*H04L 12/723* (2013.01)
*G06F 11/36* (2006.01)

(56) References Cited

U.S. PATENT DOCUMENTS

| | | | |
|---|---|---|---|
| 7,716,240 | B2 | 5/2010 | Lim |
| 8,027,354 | B1 | 9/2011 | Portolani |
| 8,141,075 | B1 | 3/2012 | Chawla et al. |
| 8,245,281 | B2 | 8/2012 | Cheeniyil et al. |
| 8,307,362 | B1 | 11/2012 | Gong et al. |
| 8,407,413 | B1 | 3/2013 | Yucel et al. |
| 8,429,362 | B1 | 4/2013 | Natanzon et al. |
| 2001/0039576 | A1 | 11/2001 | Kanada |
| 2004/0199566 | A1* | 10/2004 | Carlson et al. ............ 709/201 |
| 2004/0243699 | A1 | 12/2004 | Koclanes et al. |
| 2009/0254610 | A1 | 10/2009 | Arthursson |
| 2009/0316711 | A1* | 12/2009 | Memon et al. ............ 370/412 |
| 2011/0185064 | A1 | 7/2011 | Head et al. |
| 2013/0055261 | A1 | 2/2013 | Han et al. |
| 2013/0066923 | A1 | 3/2013 | Sivasubramanian et al. |
| 2013/0198450 | A1 | 8/2013 | Malwankar et al. |
| 2014/0330937 | A1 | 11/2014 | O'Shea et al. |

OTHER PUBLICATIONS

"MPSTOR Features/Capabilities", Jan. 1, 2012, Available at: http://mpstor.com/index.php/solutions/feature-capability.
Uttamchandani, et al., "vSOM: A Framework for Virtual Machine-centric Analysis of End-to-End Storage IO Operations", Published on: Dec. 2012, Available at: http://labs.vmware.com/vmtj/vsom-a-framework-for-virtual-machine-centric-analysis-of-end-to-end-storage-io-operations.
Alizadeh, et al., "Less is More: Trading a little Bandwidth for Ultra-Low Latency in the Data Center", In Proceedings of the 9th USENIX Conference on Networked Systems Design and Implementation, Apr. 25, 2012, 14 pages.
Ballani, et al., "Towards Predictable Datacenter Networks", In Newsletter of ACM SIGCOMM Computer Communication Review, vol. 41, Issue 4, Aug. 15, 2011, 12 pages.
Barham, et al., "Using Magpie for Request Extraction and Workload Modelling", In Proceedings of the 6th Conference on Symposium on Operating Systems Design & Implementation, vol. 6, Dec. 2004, 14 pages.
Casado, et al., "Ethane: Taking Control of the Enterprise", In Proceedings of the Conference on Applications, Technologies, Architectures, and Protocols for Computer Communications, Aug. 27, 2007, 12 pages.
"Iometer", Nov. 8, 2003, Available at: http://www.iometer.org/.
Ghodsi, et al., "Multi-Resource Fair Queueing for Packet Processing", In Proceedings of the ACM SIGCOMM Conference on Applications, Technologies, Architectures, and Protocols for Computer Communication, Aug. 13, 2012, 12 pages.
Gulati, et al., "PARDA: Proportional Allocation of Resources for Distributed Storage Access", In Proceedings of the 7th Conference on File and Storage Technologies, Feb. 24, 2009, 14 pages.
Gulati, et al., "mClock: Handling Throughput Variability for Hypervisor IO Scheduling", In Proceedings of the 9th USENIX Conference on Operating Systems Design and Implementation, Oct. 4, 2010, 14 pages.
Koponen, et al., "Onix: A Distributed Control Platform for Large-scale Production Networks", In Proceedings of the 9th USENIX Conference on Operating Systems Design and Implementation, Oct. 4, 2010, 14 pages.
Li, et al., "Making Geo-Replicated Systems Fast as Possible, Consistent when Necessary", In Proceedings of the 10th USENIX Conference on Operating Systems Design and Implementation, Oct. 8, 2012, 14 pages.

Mesnier, et al., "Differentiated Storage Services", In Proceedings of the Twenty-Third ACM Symposium on Operating Systems Principles, Oct. 23, 2011, 14 pages.
"Allocated Altitudes", Jun. 18, 2013, Available at: http://msdn.microsoft.com/en-us/library/windows/hardware/dn265170(v=vs.85).aspx.
"Scanner File System Minifilter Driver", Published on: Jul. 26, 2013, Available at: http://code.msdn.microsoft.com/windowshardware/Scanner-File-System-426c8cbe.
Ongaro, et al., "Fast Crash Recovery in RAMCloud", In Proceedings of the Twenty-Third ACM Symposium on Operating Systems Principles, Oct. 23, 2011, 13 pages.
Popa, et al., "FairCloud: Sharing the Network in Cloud Computing", In ACM SIGCOMM Conference, Aug. 13, 2012, 12 pages.
Raghavan, et al., "Cloud Control with Distributed Rate Limiting", In Proceedings of the Conference on Applications, Technologies, Architectures, and Protocols for Computer Communications, Aug. 27, 2007, 12 pages.
Sambasivan, et al., "Diagnosing Performance Changes by Comparing Request Flows", In Proceedings of the 8th USENIX Conference on Networked Systems Design and Implementation, Mar. 30, 2011, 14 pages.
"SDN Central", Aug. 1, 2013, Available at: http://www.sdncentral.com/.
Shue, et al., "Performance Isolation and Fairness for Multi-Tenant Cloud Storage", In 10th USENIX Symposium on Operating Systems Design and Implementation, Oct. 2012, 14 pages.
Thereska, et al., "Sierra: Practical Power-proportionality for Data Center Storage", In Proceedings of the Sixth Conference on Computer Systems, Apr. 10, 2011, 14 pages.
Wachs, et al., "Argon: Performance Insulation for Shared Storage Servers", In 5th USENIX Conference on File and Storage Technologies, Feb. 13, 2007, 16 pages.
Wang, et al., "Cake: Enabling High-level SLOs on Shared Storage Systems", In Proceedings of the Third ACM Symposium on Cloud Computing, Oct. 14, 2012, 14 pages.
Welsh, et al., "SEDA: An Architecture for Well-Conditioned, Scalable Internet Services", In Proceedings of the Eighteenth ACM Symposium on Operating Systems Principles, Oct. 21, 2001, 14 pages.
"Memcached", Retrieved on: Jul. 31, 2013, Available at: http://en.wikipedia.org/wiki/Memcached.
"Token Bucket", Retrieved on: May 26, 2013, Available at: http://en.wikipedia.org/wiki/Token_bucket.
Yany, et al., "Tesseract: A 4D Network Control Plane", In Proceedings of the 4th USENIX Conference on Networked Systems Design & Implementation, Apr. 11, 2007, 14 pages.
Bertsekas, et al., "Data Networks", Published on: Jan. 5, 1992, Available at: http://web.mit.edu/dimitrib/www/datanets.html.
O'Shea et al., U.S. Appl. No. 13/886,295, filed May 3, 2013 "End-to-end classification of storage traffic streams".
PCT International Search Report and Written Opinion in International Application PCT/US2014/054634, mailed Feb. 5, 2015, 10 pgs.
PCT International Search Report & Written Opinion in International Application No. PCT/US2014/036474, mailed Sep. 3, 2014, 9 pgs.
"VMware ESX and VMware ESXi", Published on: Nov. 22, 2009, Available at: http://www.vmware.com/files/pdfNMware-ESX-and-VMware-ESXi-DS-EN.pdf, 6 pages.
Pawar, et al., "Priority Based Dynamic Resource Allocation in Cloud Computing", Sep. 22, 2011, Available at: http://www.hipc.org/hipc2012/documenls/SRSPapers/Paper%2025.pdf, 6 pages.
Carmsu, "Storage Automation in VMM 2012", Published on: Mar. 28, 2011, Available at: http://blogs.technet.com/b/scvmm/archive/2011/03/29/storage-automation-in-vmm-2012.aspx, 3 pages.
Moothoor, et al., "A Cloud Computing Solution in Universities", Published on: Jan. 5, 2010, Available at: http://www.ibm.com/developerworks/webservices/library/ws-vcl/, 8 pgs.
"About the IFS Kit", Published Nov. 2, 2004, Available at: http://msdn.microsoft.com/en-us/library/windows/hardware/gg463071.aspx, 7 pgs.
"OSR Online IFS FAQs", Published Oct. 23, 2007, Available at: http://www.osronline.com/article.cfm?article=17, 42 pages.

(56) References Cited

OTHER PUBLICATIONS

"File System Minifilter Drivers", Published Nov. 21, 2012, Available at: http://msdn.microsoft.com/en-us/library/windows/hardware/ff540402(v=vs.85).aspx, 2 pgs.

"Pending an I/O Operation in a Preoperation Callback Routine", Published Nov. 21, 2012, Available at: http://msdn.microsoft.com/en-us/library/windows/hardware/ff551049(v=vs.85).aspx, 3 pgs.

"Managing Contexts in a Minifilter Driver", Published Nov. 21, 2012, Available at: http://msdn.microsoft.com/en-us/library/windows/hardware/ff549729(v=vs.85).aspx, 3 pgs.

FLT_Callback_Data Structure, Published Nov. 21, 2012, Available at: http://msdn.microsoft.com/en-us/library/windows/hardware/ff544620(v=vs.85).aspx, 8 pgs.

"FLT_Parameters Union", Published Nov. 21, 2012, Available at: http://msdn.microsoft.com/en-us/library/windows/hardware/ff544673(v=vs.85).aspx, 5 pgs.

"FLT_IO_Parameter_Block Structure", Published Nov. 21, 2012, Available at: http://msdn.microsoft.com/en-us/library/windows/hardware/ff544638(v=vs.85).aspx, 9 pgs.

"FLT_Parameters for IRP MJ_Create Union", Published Nov. 21, 2012, Available at: http://msdn.microsoft.com/en-us/library/windows/hardware/ff544687(v=vs.85).aspx, 5 pgs.

"IO_Security_Context Structure", Published Feb. 18, 2012, Available at: http://msdn.microsoft.com/en-us/library/windows/hardware/ff550613(v=vs.85).aspx, 7 pgs.

"FLT_Parameters for IRP MJ_Read Union", Published Nov. 21, 2012, Available at: http://msdn.microsoft.com/en-us/library/windows/hardware/ff544770(v=vs.85).aspx, 5 pgs.

"SeclookupAccountSid Function", Published Nov. 21, 2012, Available at: http://msdn.microsoft.com/en-us/library/windows/hardware/ff556579(v=vs.85).aspx, 5 pgs.

"SeclookupAccountName", Published Nov. 21, 2012, Available at: http://msdn.microsoft.com/en-us/library/windows/hardware/ff554795(v=vs.85).aspx, 4 pgs.

Magpie project, Microsoft Research, Published Aug. 30, 2009, Available at: http://research.microsoft.com/en-us/projects/magpie/, 2 pgs.

"International Preliminary Report on Patentability Issued in PCT Application No. PCT/US2014/054634", Mailed Date: Jul. 30, 2015, 6 Pages.

U.S. Appl. No. 13/886,295, Office Action mailed Oct. 6, 2015, 22 pgs.

* cited by examiner

SYSTEMS AND METHODS BASED ON POLICY CRITERIA FOR CONTROLLING THE FLOW OF DATA STORAGE INPUT/OUTPUT REQUESTS BETWEEN ENDPOINTS

BACKGROUND

Data storage systems such as large data centers and other types of data storage system are increasingly complex. The input/output path to storage is often long and comprises many layers with opaque interfaces between them. This makes it hard to enforce end-to-end policies that dictate a storage input/output flow's performance, for example, to guarantee a particular bandwidth available for the flow. A storage input/output flow comprises a stream of storage input/output requests between storage and computing endpoints. For example, to read data from a file, write data to a file or create a file to store data.

Virtualization of physical servers and virtualization of storage in enterprise data centers has led to increased complexity along storage input/output flows.

The embodiments described below are not limited to implementations which solve any or all of the disadvantages of known data storage systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Controlling data storage input/output requests is described, for example, to apply a policy to an end-to-end flow of data input/output requests between at least one computing entity and at least one store. In various examples a plurality of queues are configured at one or more stages of the end-to-end flow and controlled to adhere to a policy. In examples, each stage has a control interface enabling it to receive and execute control instructions from a controller which may be centralized or distributed. For example, the control instructions comprise queuing rules and/or queue configurations. In various examples queues and queuing rules are dynamically created and revised according to feedback about any of: flow behavior, changes in policy, changes in infrastructure or other factors. In examples, high level identifiers of the flow endpoints are resolved, on a per stage basis, to low level identifiers suitable for use by the stage.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
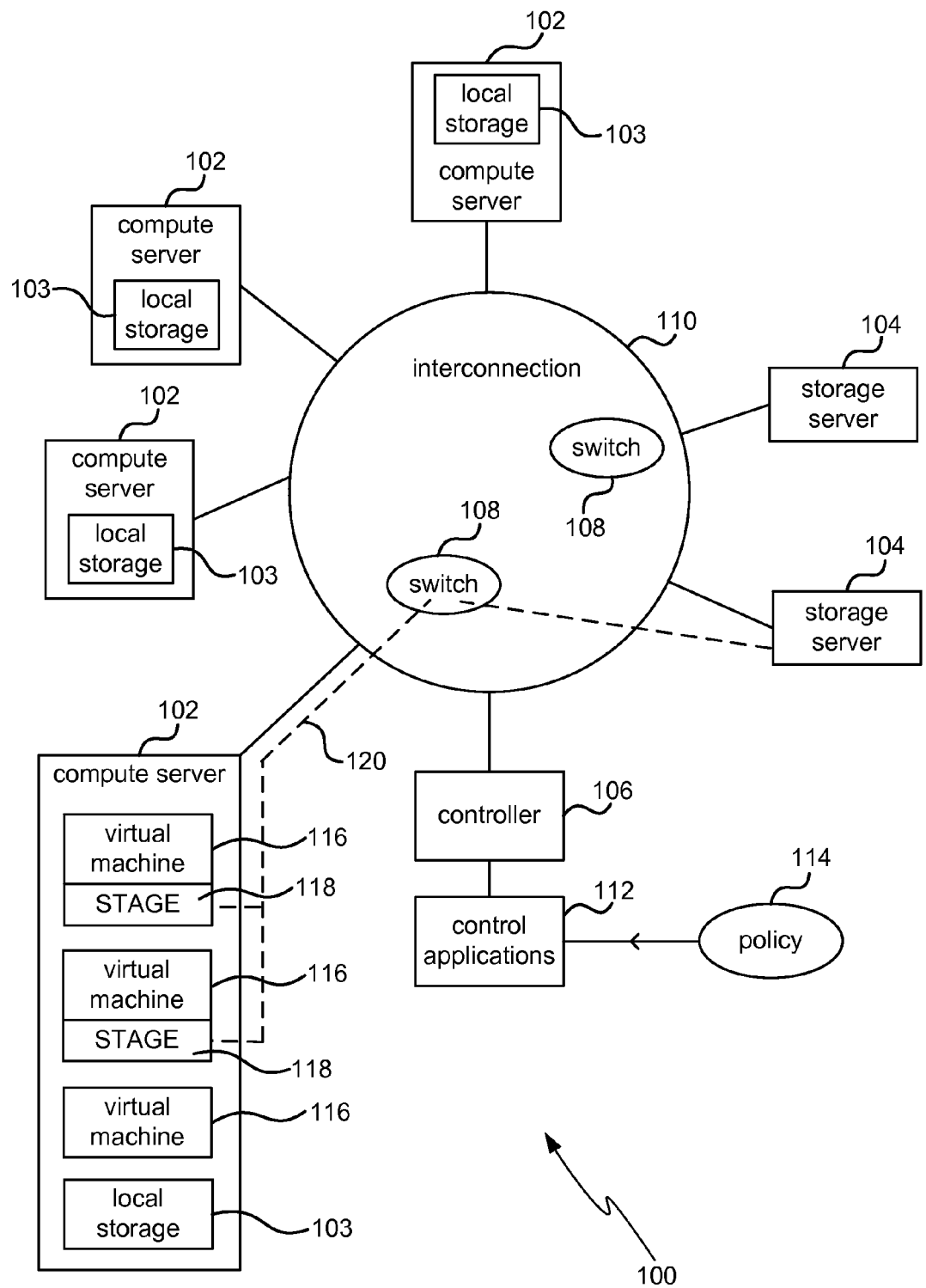
FIG. 1 is a schematic diagram of a data storage system comprising a data center.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a data center with a centralized controller, the system described is provided as an example and not a limitation. As those skilled in the art will appreciate, the present examples are suitable for application in a variety of different types of data storage systems including personal computers, and where decentralized controllers are used.

As described above the input/output path to storage is often long and complex and this makes it hard to enforce end-to-end policies, for example, to guarantee a particular quality of service or to ensure requests are routed through a sanitization middlebox. Often many different customers have processes running in a data center or other data storage system and resources are shared. For example, storage resources and interconnection resources between entities in the data storage system. It becomes very difficult to adhere to customer (or other) policies for performance and treatment of storage input/output requests and this may present a barrier to the adoption and advancement of cloud computing services.

The methods and apparatus described herein enable end-to-end policies to be applied to flows of data storage input/output requests where a flow is a stream of such requests between specified endpoints. At least one of the endpoints is a computing entity such as a compute server and at least one of the endpoints is a store such as a file share on a storage server or a file share on local storage at a compute server. A compute server may also comprise a store in some examples. A storage server may also comprise a computing entity in some examples. In this way policies may be applied to compute-to-compute flows and/or to server-to-server flows. Policies can be applied to multi-point flows such as many-to-one arrangements, one-to-many arrangements and many-to-many arrangements. The endpoints of a flow may be specified using high level identifiers which may not be understood by one or more layers of the flow. Layers are explained in more detail below.

A policy comprises one or more criteria specifying performance of a flow and/or functionality to be applied to a flow, where the flow is specified in terms of its endpoints. For example, criteria specifying performance may comprise a minimum bandwidth to be applied to a flow. Criteria specifying functionality may comprise a virus check function to be applied to a flow.

A layer is a component of a data storage system through which a flow passes. A non-exhaustive list of examples of a layer is: a network driver at a hypervisor of a compute server, a network driver at a storage server, a switch in an interconnection of a data storage system. Layers which have a control interface which enables them to communicate with a controller are referred to in this document as "stages". In the examples described herein at least one stage is used to control a flow in order to adhere to a policy. Data storage systems operating the methods described herein may have one or more stages. As the proportion of layers in a data center which are stages increases, so does the flexibility and power of the policy enforcement ability. This enables the technology to work in existing data storage systems without the need to upgrade each layer to become a stage.

Each stage comprises a plurality of queues which may be received and installed as a result of control instructions received from a controller. The controller may be centralized or distributed. By sending control instructions to stages the queues may be dynamically configured to enable policy enforcement. Feedback comprising flow behavior, policy updates, changes in infrastructure and other factors may be used to dynamically configure the queues.

FIG. 1 is a schematic diagram showing an example storage system 100 which comprises a plurality of storage servers 104 which store data and a plurality of compute servers 102 which run computations which read from and write to the storage servers 104 and/or to local storage 103 at one or more of the compute servers. In this example a flow of storage input/output requests is represented by dotted line 120 from two virtual machines 116 at a compute server 102 to a single storage server 104 via a switch 108 in interconnection 110. This is one example only; storage input/output requests may flow between a virtual machine and local storage or between other entities.

Interconnection 110 comprises communications links of any suitable type such as Ethernet, switched fabric computer network communications links such as an InfiniBand (trade mark) communications links or others which interconnect the compute servers 102, the local storage 103 and the storage servers 104. One or more switches 108 may be present in the interconnection 110 but this is not essential. Various communications protocols may be used to send the storage input/output requests over the communications links as described in more detail below.

Although this diagram shows four compute servers and two storage servers, the methods described herein are equally applicable to smaller systems (e.g. a single PC) or to systems having many more computer servers and/or storage servers than shown in FIG. 1. As mentioned above it is possible to use entities which provide both compute server functionality and storage server functionality rather than separating these functions.

FIG. 1 also shows a controller 106 which is connected to the interconnection 110 and so able to communicate with one or more stages of the data storage system. As mentioned above, a stage is a layer of a flow which has a control interface enabling it to communicate with the controller. In this example, the controller is centralized. However, it is also possible for the functionality of the controller to be distributed through a plurality of entities in the data storage system 100 such as at the stages.

Connected to the controller 106 are one or more control applications 112 which receive a policy 114 from an operator, customer, library of policies, automated entity or other source. The control applications operate together with the controller 106 to enforce the policy 114 by sending control instructions to one or more stages. In the example of FIG. 1 two of the virtual machines 116 each have a stage 118.

Alternatively, or in addition, the functionality of a stage and/or the controller described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Figure 2:
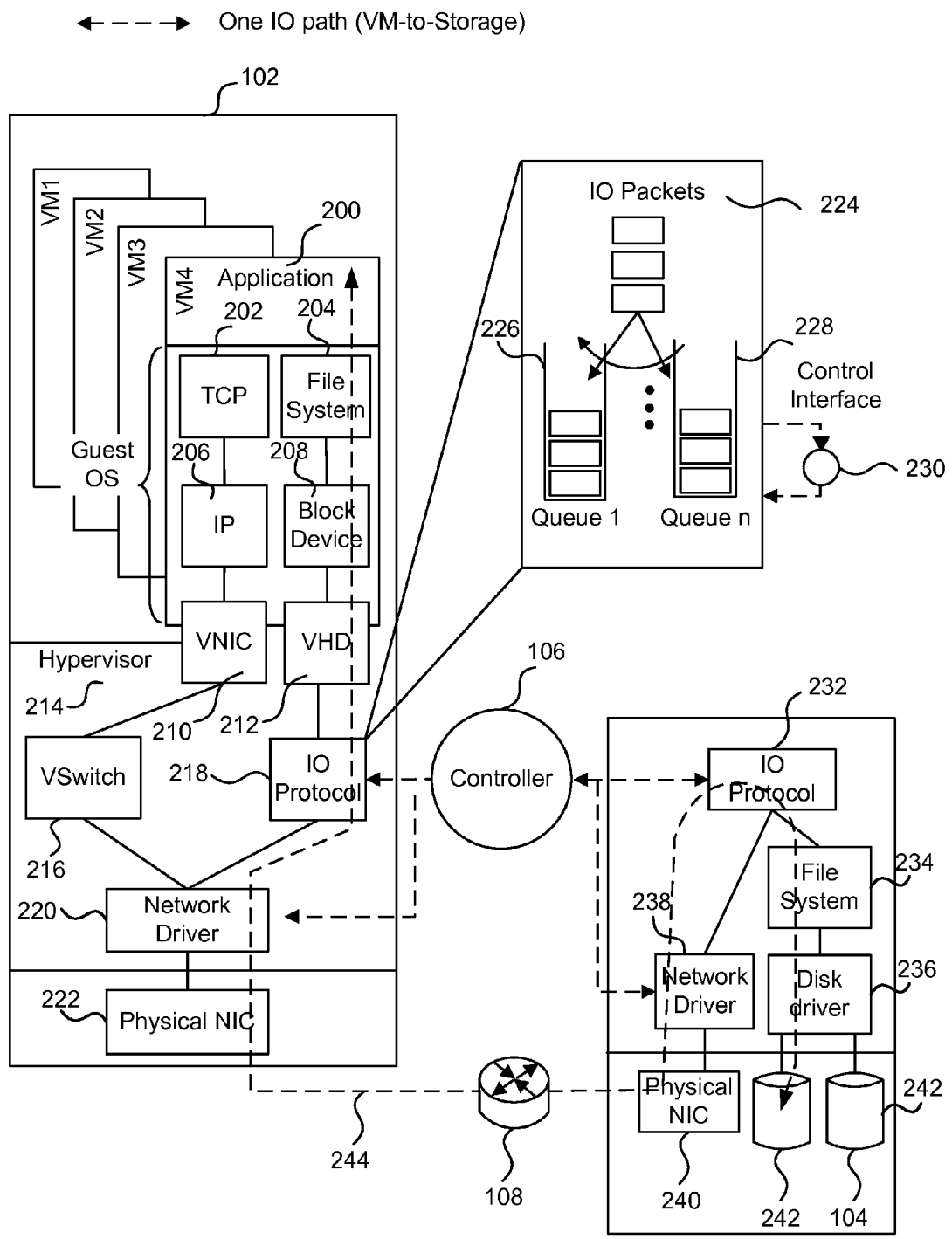
FIG. 2 is a schematic diagram of a compute server and a storage server.

FIG. 2 is a schematic diagram of an example of a compute server 102 and an example of a storage server 104 which may be used in the arrangement of FIG. 1 or in other arrangements. In this example the compute server exploits virtualization. However, this is not essential; compute servers which do not have virtual machines and/or a hypervisor may also be used.

The compute server 102 comprises a hypervisor 214 (also known as a virtual machine monitor) which is able to create and run one or more virtual machines at the compute server 102. This enables a plurality of different processes or applications to be executed at the compute server 102 in parallel, by using different virtual machines for different processes. The hypervisor 214 is computer-implemented using software and/or hardware. In the example of FIG. 2 four virtual machines labeled VM1, VM2, VM3 and VM4 are illustrated schematically as being present at the compute server 102. However, other numbers of virtual machines may be used (zero, one, two or more).

In the example of FIG. 2 virtual machine 4 executes an application 200 using a guest operating system indicated by the bracketed region labeled "Guest OS" in FIG. 2. The guest operating system comprises a communications protocol stack and a storage stack. The communications protocol stack comprises, in this example, transport control protocol (TCP) 202, interne protocol (IP) 206 and a virtual network interface card (VNIC) 210. The storage stack comprises a file system 204, a block device 208 and a virtual hard disk 212. The virtual hard disk 212 is connected via an input-output protocol component 218 to a network driver 220 controlling a physical network interface card 222 at the compute server 102. The virtual network interface card 210 is also connected to the network driver 220. The connection is via a virtual switch 216.

The input-output (IC)) protocol component 218 comprises a plurality of queues and may be implemented using server message block (SMB) or any other suitable distributed storage protocol. In the example of FIG. 2 the IO protocol component is shown in more detail as having two queues 226, 228 to which incoming IO packets 224 (which are the storage input/output requests) are allocated. In this example each queue is associated with a specified flow so that queue 226 is for packets of flow 1 and queue 228 is for packets of flow n. However, it is not essential for a queue to be associated with a particular flow. For example, a queue may be a default queue which takes any packets remaining unallocated to any other queue at the stage.

The IO protocol component 218 is a stage because it comprises a control interface 230 for interfacing with the controller 106. The controller 106 is an example of the controller of FIG. 1. The controller 106 is able to communicate with the IO protocol component 218 and the network driver 220 in order to create, delete, edit, and configure the queues 226, 228, and queuing rules and in order to obtain feedback about behavior of the queues. The queuing rules may be stored at the IO protocol component 218 and/or the network driver 220 which are both stages in this example.

The storage server 104 also comprises two stages which are an IO protocol component 232 and a network driver 238. The IO protocol component may be implemented using server message block (SMB) or any other suitable distributed storage protocol. In this example the IO component 232 at the storage server 104 has no queues created (although it may have queues in some examples).

The storage server 104 comprises a file system 234 in communication with a disk driver 236 which controls storage disks 242 or other storage devices. The storage server 104 also comprises a physical network interface card 240 connected to network driver 238.

Dotted line 244 represents a flow of storage input output requests between application 200 at virtual machine 4 and storage disks 242 at storage server 104. The flow of requests in this example travels from the file system 204 of the application 200, to the block device 208 of the guest operating system to the virtual hard disk 212 and the IO protocol component 218 of the hypervisor. It continues to the network driver 220 of the compute server 102 to the physical network interface card 222 and over one or more communications links to switch 108 and on to the physical network interface card 240 of the storage server 104. It progresses through the network driver 238 to the IO protocol component 232 of the storage server 104 and to the file system 234 and disk driver 236 of the storage server, ending at disk 242. The flow of requests in this example is bi-directional. Controller 106 may enforce a policy on the flow of IO requests using the methods described herein.

Figure 3:
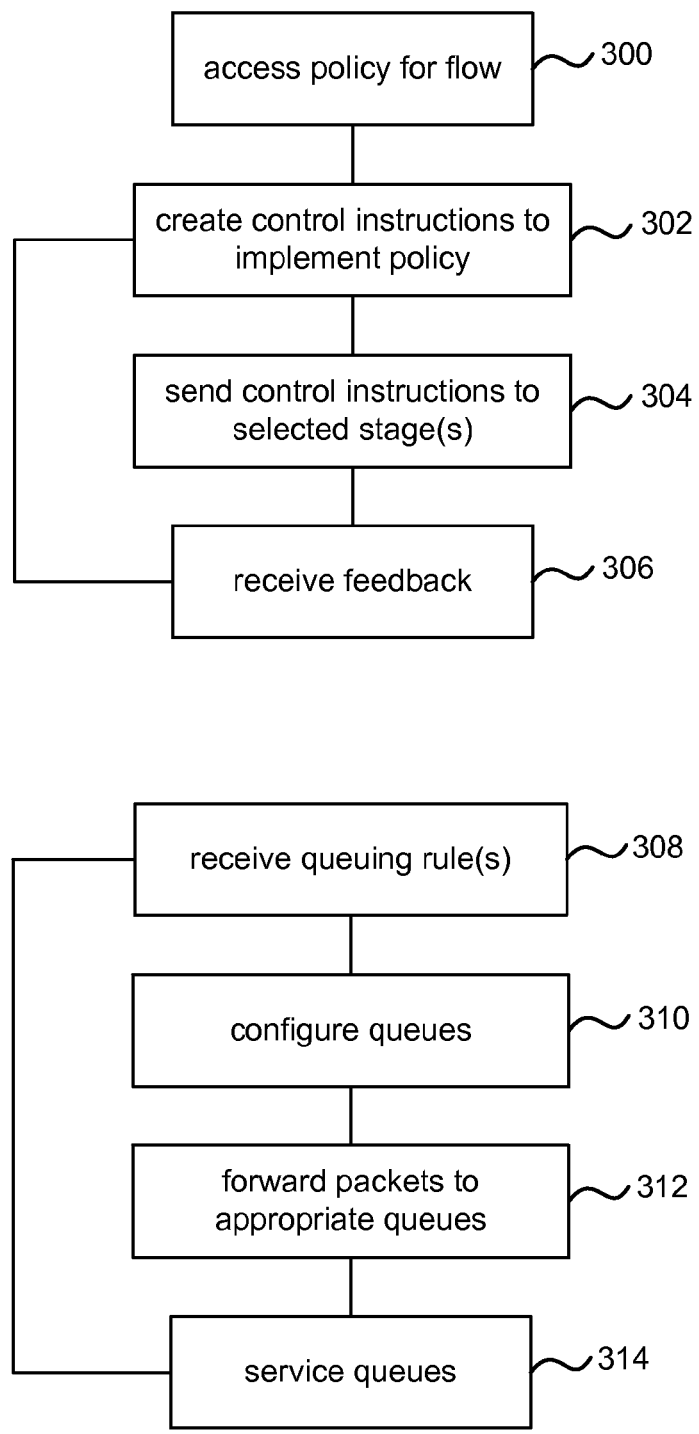
FIG. 3 is a flow diagram of a method at a controller and a method at a stage.

FIG. 3 is a flow diagram of an example method at a controller and an example method at a stage. The method at the controller may be referred to as a method at a control plane and the method at a stage may be referred to as a method at a data plane. The controller may be centralized as illustrated in FIGS. 1 and 2 or may be distributed, for example, using functionality at the stages.

The controller accesses 300 a policy for a flow. For example, the policy may be a pre-configured policy, may be selected from a library of policies according to thresholds, criteria or rules, may be entered by a user, may be selected by a customer from a plurality of available policies or may be accessed in other ways.

Some examples of policies are now given although these are examples only and other policies may be used.

For ease of exposition example flow policies of the form: {[Set of VMs], [Set of storage shares]}→Policy are now given. However, other formats for expressing flow policies may be used.

Policy P1. {VM p, Share X}→Bandwidth B. In this example, VM p runs a SQL client that accesses SQL data files on storage share X. To give good query performance, p is guaranteed bandwidth B when accessing the share. B may be expressed in tokens per second. Tokens are explained in more detail below.

Policy P2. {p, X}→Min bandwidth B. The setup is similar to policy P1 with VM p promised a minimum bandwidth B when accessing share X. Thus, when other VMs are idle, p is able to exceed its bandwidth guarantee.

Policy P3. {p, X}→Sanitize. VM p runs untrusted code and its traffic is routed through a sanitization layer such as a virus checker or other checking process.

Policy P4. {p, X}→High priority. VM p runs a SQL client that accesses SQL log files on storage share X. To ensure low latency for log operations, p's storage traffic requires high priority treatment along the end-to-end path.

Policy P5. {[p, q, r], [X,Y]}→Bandwidth B. VMs p, q and r belong to the same customer and when accessing share X and Y, they are guaranteed bandwidth B. Such per-customer guarantees are useful since any of the VMs involved is able to use the bandwidth guarantee.

Policies P1-P4 specify treatment of point-to-point flows whereas P5 applies to multi-point flows.

The controller creates 302 control instructions to implement the policy. For example, consider policy P1. Storage traffic from VM p traverses the guest OS and the hypervisor at the compute server, then the network switch and finally the OS at the storage server before reaching the disk array. To enforce this policy, at least one of these layers is arranged to control the rate at which request from VM p to share X are forwarded. Control instructions are created to control the rate at one or more of the layers to enforce policy P1.

As part of creating the control instructions the controller may carry out flow name resolution. For example, the policy is specified as applying to a flow with endpoints expressed using high-level names which are not understood by one or more individual layers of the flow. The controller resolves the high level endpoint names into low level identifiers that are understood by individual layers. The process of resolving the high level endpoint names gives a consistent one-to-one mapping between flow names and low level stage specific IO request identifiers. For example, for policy P1, any of the layers from VM p to share X can act as enforcement points, yet each can only observe some low-level identifiers in the requests that traverse them. The flow's destination share X may appear as a file system inside the VM and the guest OS but appears as a block device (e.g., "/dev/scsidisk5") inside the hypervisor. The hypervisor maps this to a VHD file on the storage server (e.g., "\\server\share\file.VHD"). The storage server, in turn, maps this file (e.g., "H:\file.VHD") to a specific device (e.g., "/device/ssd5").

The control instructions may comprise instructions to create, edit or delete one or more queues and/or instructions to configure parameters of a queue, such as the queue drain rate. The control instructions may also comprise queuing rules which specify criteria for allocating input/output requests to queues.

The control instructions may be written using an application programming interface (API) which sits on top of a distributed storage protocol such as SMB; however, this is not essential. More detail about how the controller creates 302 the control instructions is given below with reference to FIGS. 4 and 6.

The controller sends 304 the control instructions to one or more selected stages. For example, the control instructions are sent over the communications links described above with reference to FIG. 1. The controller may select which one or more stages to send the control instructions to as described in more detail below. For example, using criteria such as efficiency of policy enforcement.

As mentioned above, flow policies may be enforced at more than one stage along a flow's path. For example, policy P1 requires that VM p's bandwidth never exceed B. This bandwidth limit can be enforced at any stage inside the VM, at the hypervisor, at the network switch or even at the storage server itself. As a contrast, policy P4 entails VM p's packets achieve high priority, so it needs to be enforced at all stages along the end-to-end path.

Multi-point policies add another dimension to the need for distributed enforcement; that is, sending control instructions to more than one stage. For example, policy P5 requires that the aggregate traffic from VMs p, q and r to shares X and Y be rate limited. This can be enforced either at each of the compute servers hosting these VMs and/or at the storage servers where the shares are mounted.

In some examples the controller receives 306 feedback about flow behavior, queue behavior, policy enforcement, or other factors. It uses the feedback to dynamically create control instructions to implement the policy. In this way the process at the controller is able to continually adapt the control instructions in order to strive for fair and accurate policy enforcement in the face of changing conditions. This may be referred to as "dynamic enforcement".

An example of a policy which may be enforced without the need for dynamic enforcement is policy P1 which sets a static bandwidth limit for VM p's traffic. Static enforcement rules are also operable for policies P3 and P4. As a contrast, policy P2 uses dynamic enforcement. Policy P2 requires that the bandwidth limit for VM p is adjusted based on the spare system capacity (without going below the minimum guarantee). Similarly, multi-point policies like P5 that offer aggregate guarantees use dynamic enforcement rules.

The process at a stage comprises receiving one or more queuing rules 308 as part of the control instructions from the controller. The stage configures its one or more queues 310 according to the control instructions and forwards 312 storage IO packets to the appropriate queues at that stage according to the queuing rules. The stage services 314 its queues, for example, according to service criteria and rules which may also be specified by the controller.

Figure 4:
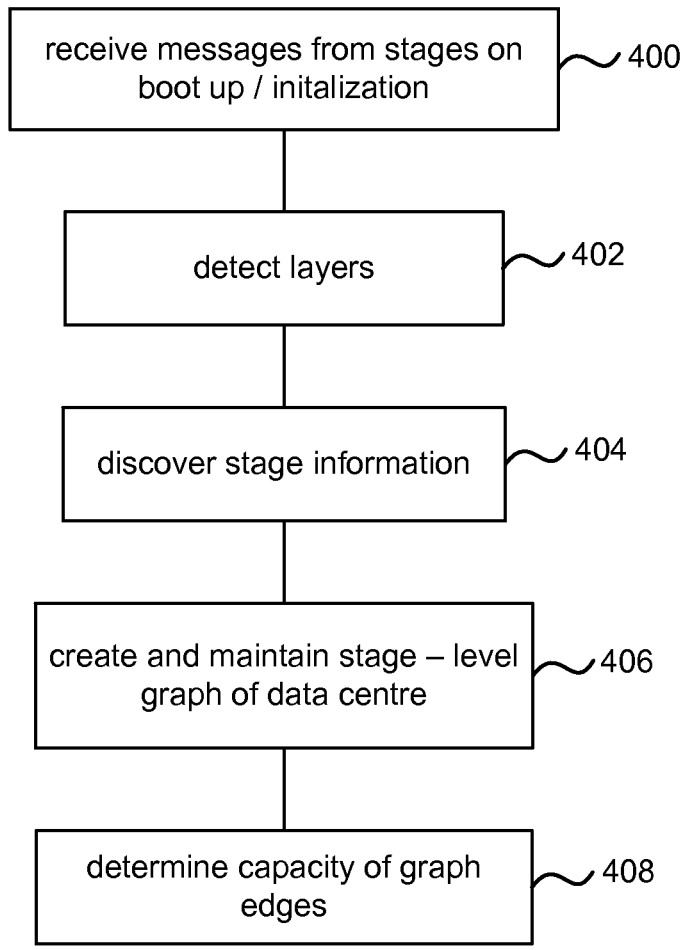
FIG. 4 is a flow diagram of a discovery method at a controller.

FIG. 4 is a flow diagram of a discovery method at a controller (which may be centralized or distributed). This method enables a controller to create and maintain a stage-level topology graph of a storage system such as a data center or other storage system. Where the controller is distributed and comprises functionality at each stage, then each stage may create and maintain a stage-level topology graph in some examples. A stage-level topology graph comprises a node for each stage of a storage system and edges connecting the nodes in a manner representing communications links between the stages in the storage system.

The controller receives (see step 400 of FIG. 4) messages from individual stages when they boot up or initialize. For example, each stage may be configured to send a message to one or more specified addresses, or to broadcast a message, when it boots up or initializes. The controller may also detect one or more layers of the storage system (these are components of the storage system which do not have a dedicated interface to the controller), for example, by observing traffic in the data storage system.

The controller discovers 404 stage information, such as details of which types of IO headers a stage understands and details of service and routing properties of queues at the stage. Service properties of a queue govern how fast it is services, and routing properties dictate the next stage to which IO requests are routed. The controller may discover 404 the stage information by sending queries to stages, by observing behavior of stages or in other ways.

The controller creates and maintains 406 a stage-level topology graph of the storage system, such as a data center or other storage system. As mentioned above a stage-level topology graph comprises a node for each stage of a storage system and edges connecting the nodes in a manner representing communications links between the stages in the storage system. An example of a stage-level topology graph is given in FIG. 5. Optionally the controller determines capacities of edges of the graph corresponding to physical resources. This may be achieved by using a pre-configured topology map. It is also possible to discover the capacities by running benchmarking processes such as Iometer (trade mark) or other measurement and characterization tools.

Figure 5:
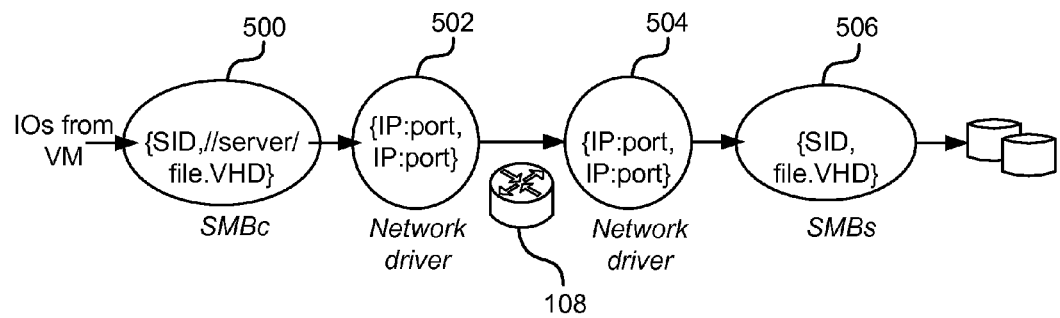
FIG. 5 is a schematic diagram of a topology graph.

FIG. 5 is a stage-level topology graph of the arrangement of FIG. 2. It comprises four stages 500, 502, 504, 506. Storage IO requests from a virtual machine (VM) reach the first stage 500 corresponding to IO protocol component 218 and continue to network driver 220 which is the second stage 502. The requests travel via switch 108 to the network driver 238 at the storage server which is stage 504 of FIG. 5. The IO requests proceed to IO protocol component 232 corresponding to stage 506 of FIG. 5 and the flow ends at storage disks at the storage server. In the example of FIG. 5 the distributed storage protocol being used in SMB although this is not essential; other distributed storage protocols may be used. The stage-level topology graph of FIG. 5 also includes the underlying physical resources comprising the network link, the network switch 108 and the storage backend. A simple IO flow is shown with a virtual machine accessing a virtual hard disk. In this example, the controller has discovered information about the stages and stored this information in the graph. For example, the low-level IO header which a stage can use to assign packets to queues.

Figure 6:
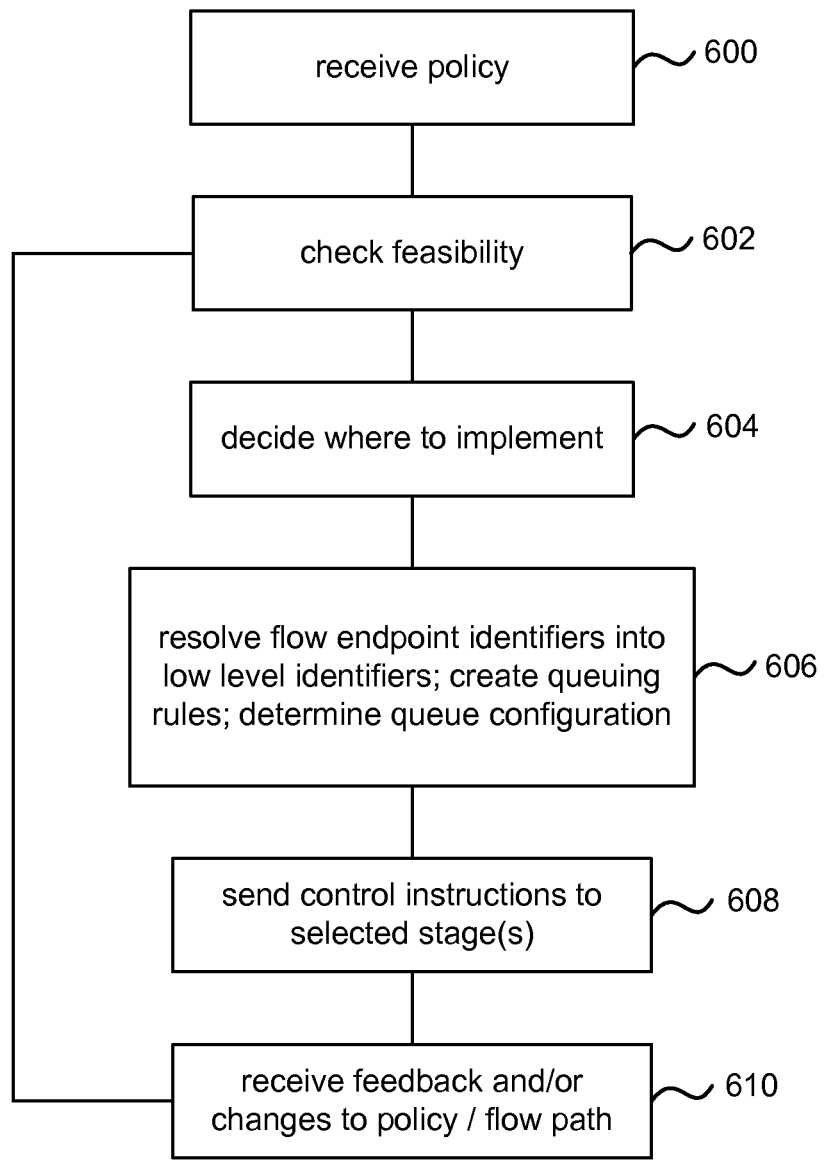
FIG. 6 is a flow diagram of a method at a controller.

FIG. 6 is a flow diagram of a method at a controller. This method is similar to the method of FIG. 3 (steps 300 to 306) and with more detail. As for FIG. 3 this method may be implemented at a centralized controller or may be distributed between a plurality of entities.

The controller receives 600 or accesses a policy as described above with reference to FIG. 3. It may check 602 that the policy is feasible due to the capacity of the underlying physical resources and taking into account existing policies. For example, the controller may use a stage-level topology graph it has created and maintained as well as information about existing policies it has.

The controller may decide 604 where to implement the policy. For example, a plurality of stages may be available and the controller may decide which one or more of these stages to use for enforcing the policy. Various factors may be taken into account. Such as available CPU resources and others.

The controller resolves 606 the flow endpoint identifiers into low level identifiers. The controller discovers which header types a stage can understand. For example, by sending a message to the stage to request this information. Using this information it resolves the high level endpoint names into appropriate header types and generates queueing rules on the basis of the appropriate header types.

The controller creates the queuing rules and sends those to the appropriate stages to be installed. Example queueing rules for the compute server IO protocol component stage of FIG. 2 are:

1: IO Header<VM1, \\server X\share\file F>→Queue Q1
2: IO Header<VM2, \\server Z\share\*>→Queue Q2
3: IO Header<VM3, *>→Queue Q4
4: <*, *>→Queue Q3

Where "server" may be a remote machine or the local host. The symbol "*" is a wildcard. Queuing rule 1 above says that packets are allocated to queue 1 if their header says the packet is originating from VM1 and is destined for file F at server X. Queuing rule 2 above says that packets are allocated to queue 2 if their header says they are originating from VM2 and are destined to any file on server Z. Queuing rule 3 above says that packets are allocated to queue 4 if their header says they originate from VM3. Queuing rule 4 says that packets are allocated to queue 3 if they are not allocated to any of the other queues.

Example queuing rules for the IO protocol component at the storage server stage of FIG. 2 are:

1: IO Header<SID S1, H:\File F>→Queue Q1
2: IO Header<SID S2, H:\File G>→Queue Q1
3: IO Header<SID S2, H:\Directory A/*>→Queue Q2
4: <*, *>→Queue Q3

Where SID stands for security descriptor that identifies user, process and server. Queuing rule 1 above states that packets are allocated to queue 1 if their header contains an SID of server 1 and if the packet destination is file F. Queuing rule 2 above states that packets are allocated to queue 1 if their header contains an SID of server 2 and if the packet destination is file G. Note that this shows that packets belonging to different flows may be directed to the same queue. Queuing rule 3 above states that packets are allocated to queue 2 if their header contains an SID of server 2 and the packet destination is directory A. Queuing rule 4 above states that packets not matching rules 1 and 2 are allocated to queue 3.

The controller also determines configurations for each queue such as queue drain rate and queue routing. For example, the controller may set queue properties such as token rate, priority and queue size. The token rate of a queue is related to the rate at which packets drain from the queue. The priority of a queue specifies an order in which the queue is serviced with respect to other queues. The size of a queue specifies the number of packets which may be stored in the queue.

A stage that implements queues with configurable service properties may throttle or treat preferentially IO requests. Such service properties enable implementation of performance isolation policies (e.g., policies P1, P2, P4, P5 above). To throttle IO traffic, queues may use a token-bucket abstraction. The queues may be served at a constant token rate. Some queues may be treated preferentially to others as indicated by the priority field. If a queue reaches a queue size threshold, the stage may notify the controller. The controller may set service properties (<token rate, priority, queue size>) for a queue using a configureQueueService call of an API described in more detail below or in other ways. Periodically the controller may use a call of an API described in more detail below to monitor statistics describing the queue such as its average service rate and queue size or other statistics.

Some stages may allow control over how queued IO requests are routed. Queues may be associated with a default next-hop. For example, requests at the IO protocol component stage of the compute server may be routed to the network driver. Queues at this stage may be configured to allow requests to be routed to a different stage, such as a stage not even in the hypervisor. Such configurable plumbing of stages allows for a rich set of flow policies. For example, the controller may send control instructions to route IO requests from untrusted VMs through a virus scanner stage.

The controller sends 608 the control instructions to the selected stages as described above with reference to FIG. 3 and optionally receives feedback. It may receive 610 information about changes to the policy and/or changes to the flow path. For example, a customer may add or remove VMs. Files may migrate to different storage servers. This results in a new flow path along which the policy is to be enforced. The controller is able to delete queuing rules at the stages along the old flow path and add queuing rules along the new flow path.

The controller may update several stages when a new policy is defined. Particular update ordering across stages is not required in many cases and temporary inconsistent rules at each stage may be tolerated as long as they eventually converge. For example, the controller may batch any state updates with a version number to the relevant stages, wait for acknowledgements with the same version number and then proceed with any further state dissemination. Where strict update ordering is needed the controller updates each stage in the order without requiring stages to participate in distributed agreement protocols. Stage configuration may be soft state so that failure of a stage along a path (e.g., storage server failure) destroys queues and queuing rules on that stage. When the server comes back online, it contacts the control service to get a list of queuing rules it is responsible for.

In some examples the controller keeps track of a version number associated with a flow and monotonically increments that number each time it contacts the stages. Upon receiving a message with an epoch number, the stages discard any subsequent messages with lower version numbers (that could have been in the system after a temporary network partition).

Figure 7:
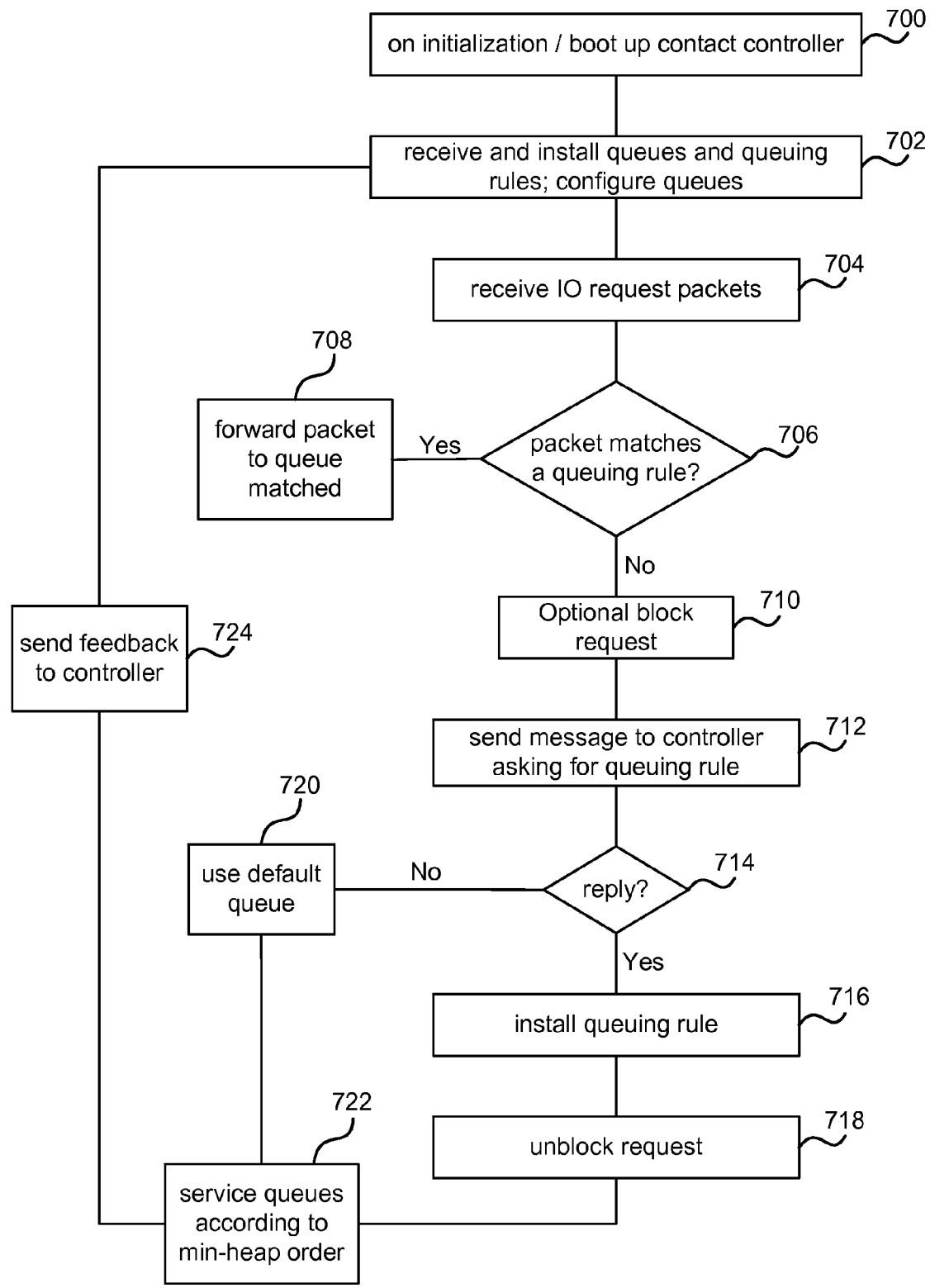
FIG. 7 is a flow diagram of a method at a stage.

FIG. 7 is a schematic diagram of a method at a stage. When a stage boots up or initializes it may contact 700 the controller to notify its presence. For example, it may send a message to the controller at a specified address or may broadcast a notification message. The stage receives and installs 702 two or more queues and at least one queuing rule per queue. It receives the queues and queuing rules as part of control instructions from the controller. The stage configures the queues by setting their drain rates and routing characteristics according to the control instructions.

The stage receives (see step 704 of FIG. 7) storage IO request packets. It checks if a packet matches a queuing rule by inspecting its header for example. If there is a match it forwards 708 the packet to the queue which matched. If there is no match, in some examples, it blocks 710 the request packet and sends 712 a message to the controller asking for a queuing rule. Note the blocking step 710 is optional. If it receives a reply 714 it installs 716 the queuing rule received from the controller and unblocks 718 the request message. If no reply is received from the controller it uses 720 a default queue for the blocked request. The queues are then serviced according to a min-heap order, or any other suitable order. Feedback about the queue behavior may be sent 724 to the controller.

Figure 8:
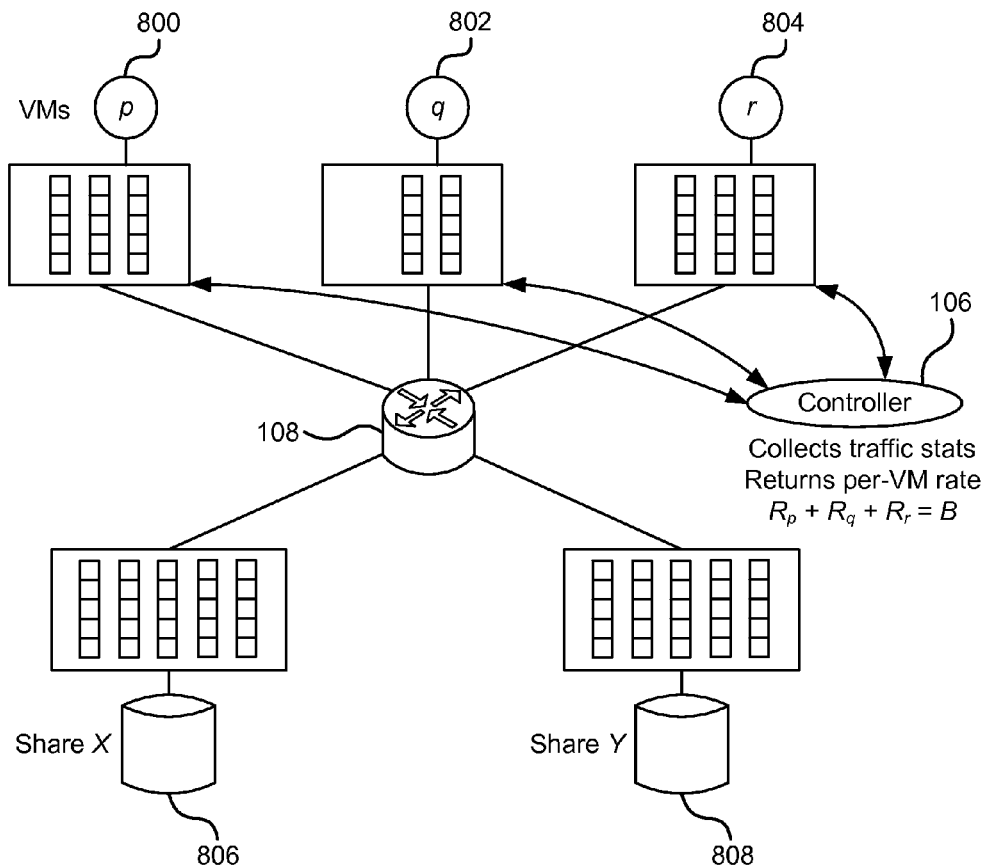
FIG. 8 is a schematic diagram of a topology sub-graph.

FIG. 8 is an example topology sub-graph comprising stages relevant for enforcement of policy P5 above. Other stages along the path from VMs to stage are omitted for clarity.

Policy P5 may be expressed as: {{p, q, r}, {X, Y}}→Bandwidth B, which means that packets from virtual machines p 800, q 802 and r 804 which are going to storage shares X 806 and Y 808 are to be guaranteed aggregate bandwidth B. This policy is particularly interesting as it involves a multi-point flow, i.e., it offers an aggregate guarantee for IOs from multiple sources (VMs p, q, r) to multiple destinations (shares X,Y). As described below, this uses dynamic configuration of stages. For example, if p is the only VM generating IOs, it should achieve bandwidth B.

This policy may be enforced as follows. Given the data center topology graph maintained by the controller 106, a control application at the controller determines a sub-graph relevant for this policy. As shown in FIG. 8, this sub-graph comprises the stages along the path from VMs p, q, r to the storage servers where shares X and Y are mounted. The edges of this graph are the links between the stages, the physical network links and the interface from the storage servers to the actual disks. The operation of the control application comprises two steps.

First, admission control. The controller ensures that edges along the graph above have enough spare capacity to meet the guarantee. The total bandwidth capacity of the network links and the links to the disks is determined by the controller's discovery component. Since some of the capacity on each link may have been reserved for pre-existing policies, this policy can only be admitted if the unreserved capacity on each link is no less than the guarantee B.

Second, enforcement. The controller ensures that the total rate of all IOs from VMs p, q, r to shares X,Y guarantees aggregate bandwidth B. This aggregate bandwidth limit may be enforced at any cut in the graph. This example is from the point of view of just one of the customers. As shown in FIG. 8, it may be enforced at the hypervisors where the VMs are hosted or at the storage servers. For this example, assume the controller chooses to enforce the bandwidth limit at a stage inside the hypervisors. To do this, it needs to determine the per-VM bandwidth limit such that the sum of the limits is equal to B. Thus, the controller application needs to do distributed rate limiting. That is, given a set of N VMs (in this example N=3) the task is to distribute bandwidth B between them. This may be achieved by giving each source its max-min fair share of the link. Max-min sharing assigns rates to VMs based on their traffic demand. i.e., the rate at which they can send traffic. Specifically, VMs are allocated rates in order of increasing demands such that no VM gets a rate larger than its demand and VMs with unsatisfied demands get equal rates. Thus, given the demand set D for the VMs, the controller determines the max-min fair share f which, in turn, dictates the rates allocated to individual VMs and ensures that those rates sum to the bandwidth.

Given these rates, the control application configures the hypervisor stages. For VM p, it creates a queue at a stage in the hypervisor where p is hosted, creates a queuing rule that directs all traffic from VM p to shares X and Y to this queue and configures the queue's drain bandwidth to the rate allocated to p. The stage configuration for VMs q and r is similar.

The controller may periodically gather statistics from the hypervisor stages to approximate VM demand. The control application uses these statistics to periodically generate updated bandwidth limits through queue draining settings.

The example described above ensures an aggregate guarantee for multi-point flows. In other examples an aggregate minimum bandwidth guarantee may be offered. This means that when VMs for one flow are inactive, VMs of other flows can utilize the spare bandwidth. For example, the controller collects traffic statistics from stage queues, and uses a hierarchical max-min sharing algorithm across all data center IO flows to determine their bandwidth limits.

As mentioned above each stage and the controller may implement an API which enables them to communicate. An example of one possible API is now given although this is one example and many other APIs may be used.

A0 getQueueInfo ( )

This API call returns the kind of IO header a stage uses for queuing and the queue properties of the stage that are configurable. It also specifies possible next-hop stages, including the default next-hop stage.

A1 getQueueStats (Queue-id q)

This API call returns queue statistics.

A2 createQueueRule (IO Header i, Queue-id q)

This API call creates a queueing rule i→q

A3 removeQueueRule (IO Header i, Queue-id q)

This API call removes a queuing rule.

A4 configureQueueService (Queue-id q,<token rate,priority, queue size>)

This API call configures one or more of the token rate, priority and size of a queue.

A5 configureQueueRouting (Queue-id q, Next-hop stage s)

This API call configures the next hop stage that a queue is to route to.

A6 configureTokenBucket (Queue-id q, <benchmark-results>)

This API call obtains benchmark results that indicate how many tokens to charge for a given request.

Figure 9:
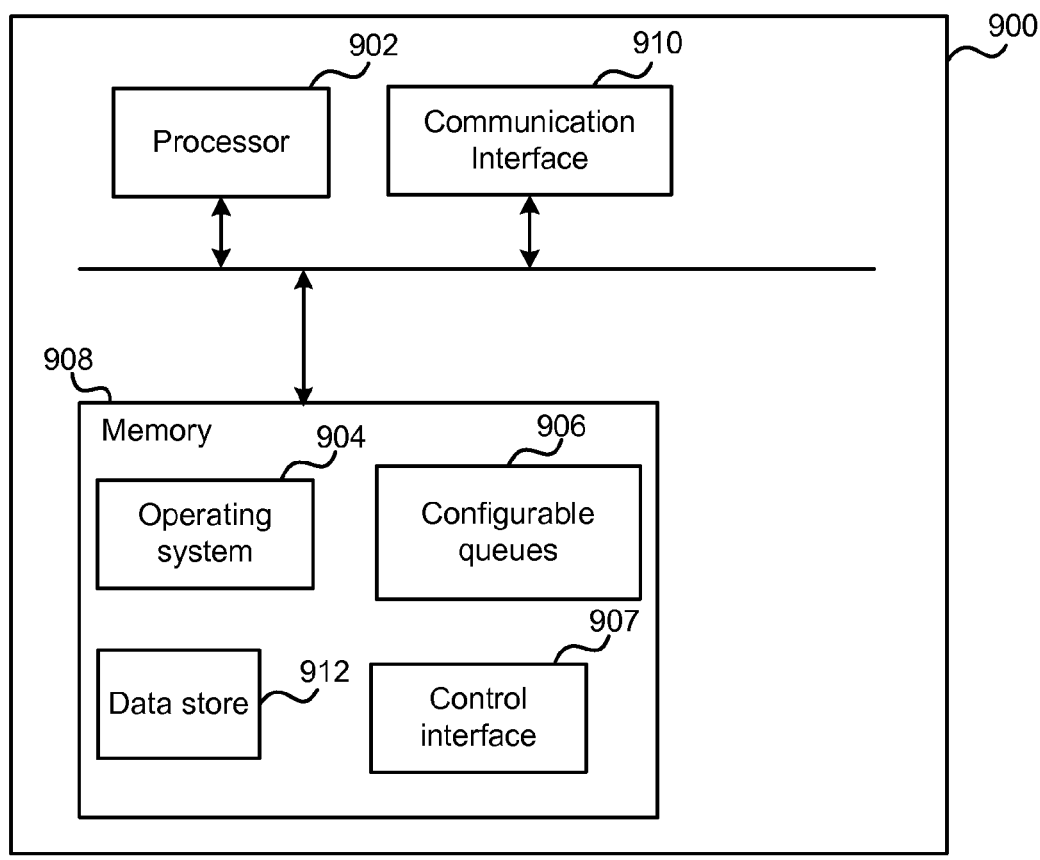
FIG. 9 illustrates an exemplary computing-based device in which embodiments of a stage of a data storage system may be implemented.

FIG. 9 illustrates various components of an exemplary computing-based device 900 which may be implemented as any form of a computing and/or electronic device, and in which embodiments of a controller and/or a stage may be implemented.

Computing-based device 900 comprises one or more processors 902 which may be microprocessors, controllers or any other suitable type of processors for processing computer executable instructions to control the operation of the device in order to control storage input output requests in a storage system. In some examples, for example where a system on a chip architecture is used, the processors 902 may include one or more fixed function blocks (also referred to as accelerators) which implement a part of the method of the controller and/or a stage in hardware (rather than software or firmware). Platform software comprising an operating system 904 or any other suitable platform software may be provided at the computing-based device to enable application software to be executed on the device.

The computer executable instructions may be provided using any computer-readable media that is accessible by computing based device 900. Computer-readable media may include, for example, computer storage media such as memory 908 and communications media. Computer storage media, such as memory 908, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 908) is shown within the computing-based device 900 it will be appreciated that the storage may be distributed or located remotely and accessed via a network or other communication link (e.g. using communication interface 910).

In the case that the computing-based device implements a stage it comprises a plurality of configurable queues 906. In the case that the computing-based device implements a controller or a stage it comprises a control interface 907 which enables the device to communicate with a controller or a stage as appropriate. A data store 912 is provided for storing topology graphs, parameter values, queuing rules, thresholds, criteria and other data.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method at a data storage system comprising:

accessing, at a processor, a policy comprising one or more criteria to be applied to a flow of data storage input/output requests between endpoints of the flow, the endpoints comprising at least one computing entity and at least one store, wherein the at least one computing entity and the at least one store are associated with high-level identifiers;

sending control instructions to at least one stage of the flow of data, the stage being a component of the data storage system through which the flow passes and which is configured to interpret the control instructions, the control instructions arranged to control a plurality of queues at the at least one stage in order to treat the flow of data storage input/output requests such that the policy is met; and resolving the high level identifiers into low level identifiers in order to process the control instructions at the at least one stage.

2. The method as claimed in claim 1 wherein the flow is between three or more endpoints.

3. The method as claimed in claim 1 wherein the flow of data storage input/output requests uses resources which are shared, at least in part, with one or more other flows.

4. The method as claimed in claim 1 wherein high level identifiers are identifiers which are not understood by the at least one stage.

5. The method as claimed in claim 1 carried out at a centralized controller in the data storage system, the data storage system having a plurality of flows of data storage input/output requests between a plurality of computing entities and a plurality of stores, each flow having at least one stage.

6. The method as claimed in claim 5 comprising maintaining topology of the plurality of computing entities and the plurality of stores and information about stages of the data storage system.

7. The method as claimed in claim 1 wherein the control instructions are arranged to create a queuing rule specifying which types of data storage input/output requests are to be placed into a specified queue at the at least one stage.

8. The method as claimed in claim 1 wherein the control instructions are arranged to configure service characteristics of a queue.

9. The method as claimed in claim 1 wherein the control instructions are arranged to configure routing characteristics of a queue.

10. The method as claimed in claim 1 wherein the stage is at one or more of: the at least one computing entity, the at least one store, and a switch present in an interconnection fabric between the at least one computing entity and the at least one store.

11. The method as claimed in claim 1 comprising selecting the at least one stage from a plurality of available stages according to criteria such as efficiency of policy enforcement.

12. The method as claimed in claim 1 comprising obtaining feedback about the flow of data storage input/output requests and modifying the control instructions on the basis of the feedback.

13. A computing device comprising:
 at least one processor; and
 at least one memory communicatively coupled to the at least one processor and storing computer-readable instructions that when executed by the at least one processor cause the computing device to:
  access a policy comprising one or more criteria to be applied to a flow of data storage input/output requests between endpoints of the flow, the endpoints comprising at least one computing entity and at least one store, wherein the at least one computing entity and the at least one store are associated with high-level identifiers;
  send control instructions to at least one stage of the flow of data, the stage being a component of the data storage system through which the flow passes and which is configured to interpret the control instructions, the control instructions arranged to control a plurality of queues at the at least one stage in order to treat the flow of data storage input/output requests such that the policy is met; and
  resolve the high level identifiers into low level identifiers in order to process the control instructions at the at least one stage.

14. The computing device as claimed in claim 13, wherein the flow is between three or more endpoints.

15. The computing device as claimed in claim 13, wherein the flow of data storage input/output requests uses resources which are shared, at least in part, with one or more other flows.

16. The computing device as claimed in claim 13, wherein high level identifiers are identifiers which are not understood by the at least one stage.

17. The computing device as claimed in claim 13, wherein the control instructions are arranged to create a queuing rule specifying which types of data storage input/output requests are to be placed into a specified queue at the at least one stage.

18. The computing device as claimed in claim 13, wherein the control instructions are arranged to configure service characteristics of a queue.

19. A computing device including at least one processor and at least one memory storing computer-readable instructions that when executed by the at least one processor cause the computing device to perform a method, the method comprising:
 accessing a policy comprising one or more criteria to be applied to a flow of data storage input/output requests between endpoints of the flow, the endpoints comprising at least one computing entity and at least one store, wherein the at least one computing entity and the at least one store are associated with high-level identifiers;
 sending control instructions to at least one stage of the flow of data, the stage being a component of the data storage system through which the flow passes and which is configured to interpret the control instructions, the control instructions arranged to control a plurality of queues at the at least one stage in order to treat the flow of data storage input/output requests such that the policy is met; and
 resolving the high level identifiers into low level identifiers in order to process the control instructions at the at least one stage.

20. The computing device as claimed in claim 19, comprising obtaining feedback about the flow of data storage input/output requests and modifying the control instructions on the basis of the feedback.

* * * * *